United States Patent
Story

[19]
[11] Patent Number: 6,116,030
[45] Date of Patent: Sep. 12, 2000

[54] VACUUM PUMP AND PROPELLANT DENSIFICATION USING SUCH A PUMP

[75] Inventor: George Taylor Story, Huntsville, Ala.

[73] Assignee: Lockheed Martin Corporation, New Orleans, La.

[21] Appl. No.: 09/336,209

[22] Filed: Jun. 18, 1999

[51] Int. Cl.$^7$ .................................................. F25B 19/00
[52] U.S. Cl. .................................. 62/7; 62/46.1; 62/50.2; 62/100; 62/268
[58] Field of Search ............................... 62/7, 50.2, 46.1, 62/100, 268

[56] References Cited

U.S. PATENT DOCUMENTS

| | | | |
|---|---|---|---|
| 5,162,094 | 11/1992 | Curtis | 376/107 |
| 5,297,389 | 3/1994 | Athey et al. | 60/657 |
| 5,343,705 | 9/1994 | Athey et al. | 60/646 |
| 5,644,920 | 7/1997 | Lak et al. | 62/47.1 |
| 5,819,542 | 10/1998 | Christiansen et al. | 62/7 |
| 5,927,082 | 7/1999 | Sidelnikov et al. | 62/50.2 |

OTHER PUBLICATIONS

"Fox Ejector Selector—a Selection Guide for Venturi–Ejector Equipment", Bulletin E–1.1, Fox Valve Development Corp., Dover, NJ.

*Primary Examiner*—Ronald Capossela
*Attorney, Agent, or Firm*—W. H. Meise; T. G. Fierke

[57] ABSTRACT

A vacuum pump of the steam-ejector type uses steam generated by the combustion of hydrogen and oxygen. The mass of ejected steam is increased, and the temperature of the ejected steam is reduced, by injection of water into the combustion product. Propellant densification is accomplished by using such a vacuum pump to reduce the vapor pressure of a cryogenic liquid, thereby reducing its temperature. The cryogenic liquid may be the propellant, or it may be a coolant medium thermally coupled to the propellant.

7 Claims, 4 Drawing Sheets

VACUUM PUMP AND PROPELLANT DENSIFICATION USING SUCH A PUMP

FIELD OF THE INVENTION

This invention relates to vacuum pumps of the Bernoulli type, and to a use of such pumps in the densification of propellants.

BACKGROUND OF THE INVENTION

The densification of propellants for vehicles has been the subject of attention because of the advantages of densification. Densification reduces the volume of a given mass of propellant, and therefore reduces the volume of the tank which is required to hold a given mass of propellant. This in itself is an advantage, in that it decreases the weight of the tank, and thereby increases the range of the vehicle, at least in principle. When the densification is accomplished by cooling, a further, less obvious advantage arises, namely that the vapor pressure of the propellant is lowered. The lowering of the vapor pressure reduces the pressure which the tank must withstand, so that the tank structure may be made thinner and therefore less massive, which further reduces the weight of the tank over and above the reduction occasioned by the densification itself.

FIG. 1 is a simplified representation of a prior-art arrangement for cooling a cryogenic propellant. In FIG. 1, a vehicle 10 may be, for example, a spacecraft. Spacecraft 10 includes at least one propellant tank, which holds a monopropellant if appropriate, or if two tanks are available on vehicle 10, one will contain fuel, and the other oxidizer, for use in a propulsion engine (not illustrated). As illustrated in FIG. 1, a circulating pump external to vehicle 10 pumps propellant from tank 12, by way of a pipe or channel 16, through a heat exchanger 18 located within a tank 20, and back to the tank 12 by way of a path 22. Tank 20 is filled, at least to the level of the top of the heat exchanger 18, with a cryogenic liquid 24, which is preferably one of the propellants, already available on the site.

In order to densify the propellant in the tank 12 of vehicle 10, the pressure of the gaseous phase of cryogenic liquid 24 is reduced by a compressor bank which is used as a cryogenic pressure reduction pump 26 connected to tank 20 at a port 21. The compressed gas is vented by a vent 28. The reduction in the pressure at the surface of cryogenic liquid 24 within tank 20 promotes vaporization of the liquid component, which causes heat to be removed from the liquid. The volume of cryogenic liquid 24 within tank 20 is maintained by a connection at a port 31 to a source of cryogenic liquid, illustrated as a vented tank 30.

It will be appreciated that a vacuum pump such as that represented by block 26 of FIG. 1 must operate continuously for many hours in order to accomplish densification of sufficient propellant for a large vehicle. A small-scale test of a system equivalent to that of FIG. 1 was performed. The manufacturer of the compressor bank which is used as a cryogenic pressure reduction pump indicates that fabrication of a single pump suitable for propellant densification for a full-size vehicle is beyond the state of the art, and as many as forty paralleled maximum-size pumps would be required to handle the densification task for such a vehicle. The reliability of such maximum-size cryogenic pumps might result in some failures among the paralleled pumps during the densification process associated with a launch.

Other possible approaches which have been suggested include the use of commercial steam ejectors in conjunction with a steam generating plant. A steam ejector is basically a Bernoulli-type vacuum generator in which pressurized steam is ejected from a nozzle and generates a partial vacuum. However, the availability of water for generation of steam at the launch site was deemed inadequate to accomplish the desired result, and burning of enough diesel fuel to generate the steam, even if sufficient water were available, was deemed to be environmentally unsound.

Yet another possibility which was considered was to combust hydrogen and oxygen, already available at the launch site, thereby generating high-energy steam for use in a steam ejector. This "Lox/Hydrogen Torch," however, is basically a rocket engine which is required to burn at some 6000° F. for several hours. Such a rocket engine has never been attempted, and would require a major investment to design, build and test, assuming that such a structure could be made and operated for the desired purpose.

SUMMARY OF THE INVENTION

A vacuum pump according to an aspect of the invention includes a first chamber defining an exit nozzle, a hydrogen injector for injecting hydrogen thereinto, and an oxygen injector for injecting oxygen thereinto, for generating a combustible mixture which, during combustion, produces pressure within the chamber and ejects combustion products from the exit nozzle. A second chamber surrounds the exit nozzle. The second chamber defines an exit region and a vacuum port, such that when the combustion products are ejected from the exit nozzle of the first chamber, a vacuum is generated at the vacuum port. The second chamber is made from a material, such as commercial-grade (nonexotic) metal as used in a commercial steam ejector, which is subject to degradation at the temperature of the combustion products. A water injector is coupled to the first chamber for injecting water thereinto, for cooling the combustion products. The water tends to be vaporized by the energy of the combustion, so as to increase the mass flow through the exit nozzle, for thereby increasing the capacity of the vacuum pump and also tending to reduce the degradation. In a particular embodiment of the invention, the pump further includes a venturi diffuser associated with the second chamber, for slowing the mass flow.

A method according to an aspect of the invention, for creating a vacuum, includes the steps of combusting a flow of hydrogen and oxygen, to thereby generate high-temperature steam, and constraining the high-temperature steam to flow through a converging-diverging nozzle, for producing a mass flow and velocity in the vicinity of the nozzle which results in a tendency to generate a vacuum. The method further includes the step of ducting the vacuum to a utilization port with a structure which is subject to degradation at the temperature of the steam produced by the hydrogen oxygen combustion. Ordinarily, this material will be a commercial grade of metal used in a commercial steam (or other) ejector. A flow of water is injected into the combusting hydrogen and oxygen, for thereby (a) increasing the mass flow of the steam, and (b) reducing the temperature of the steam. In a particular mode of the method, the mass flow of steam is slowed at a location downstream of the exit nozzle.

A method for densifying propellant according to another aspect of the invention includes the steps of combusting a flow of hydrogen and oxygen to generate high-temperature steam, and constraining the high-temperature steam to flow through a converging-diverging nozzle, for producing a mass flow and velocity in the vicinity of the nozzle which results in a tendency to generate a vacuum. The vacuum is ducted to a utilization port with a structure, ordinarily of conventional metals, which is subject to degradation at the f temperature of the steam produced by the combustion of hydrogen and oxygen. flow of water is injected into the combusting hydrogen and oxygen, for thereby (a) increasing the mass flow of the steam, and (b) reducing the temperature of the steam. The vacuum is coupled from the utilization port to a tank of cryogenic liquid, for thereby reducing its ullage pressure and tending to increase vaporization of the propellant, which lowers its temperature. The cryogenic liquid may be the propellant itself, or a heat transfer medium.

DESCRIPTION OF THE INVENTION

Figure 1:
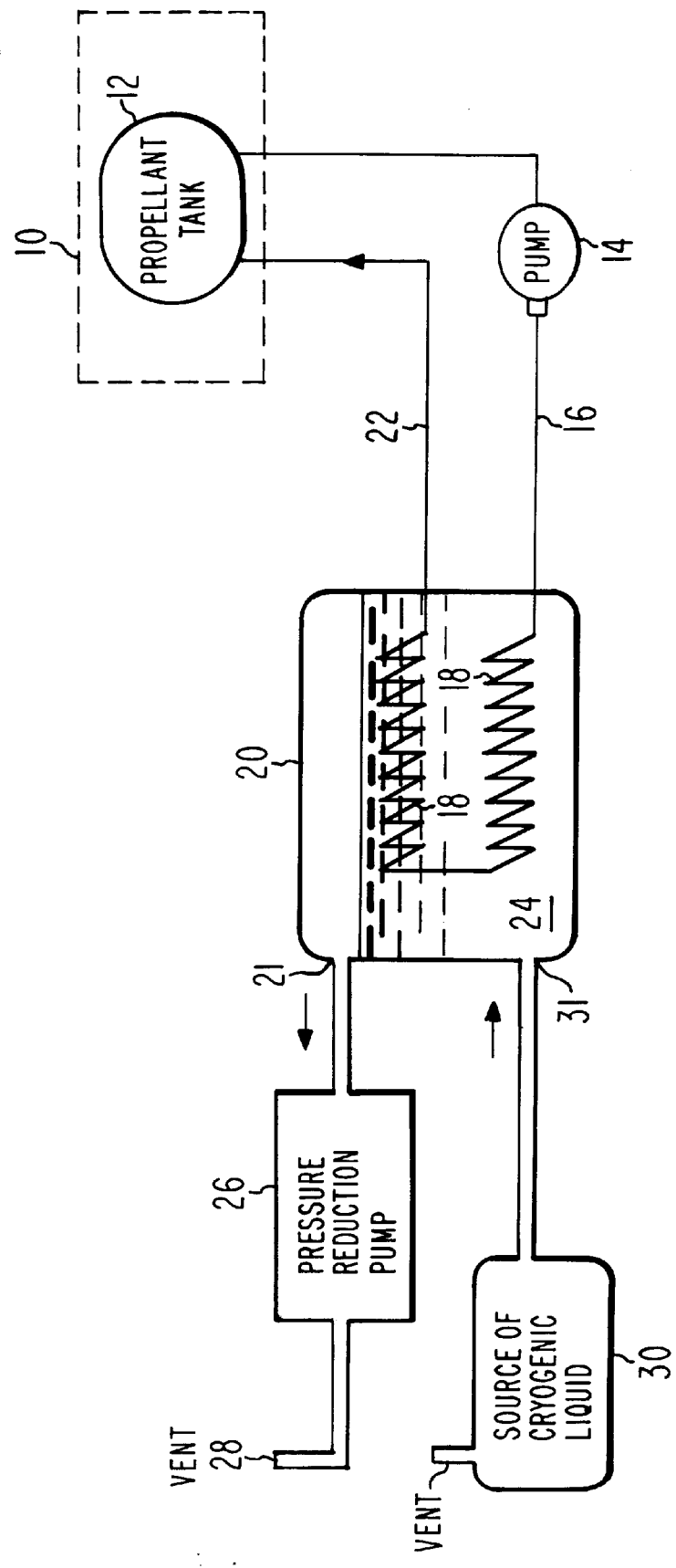
FIG. 1 is a simplified representation of a prior-art propellant densification scheme using a conventional cryogenic pump.
Figure 2:
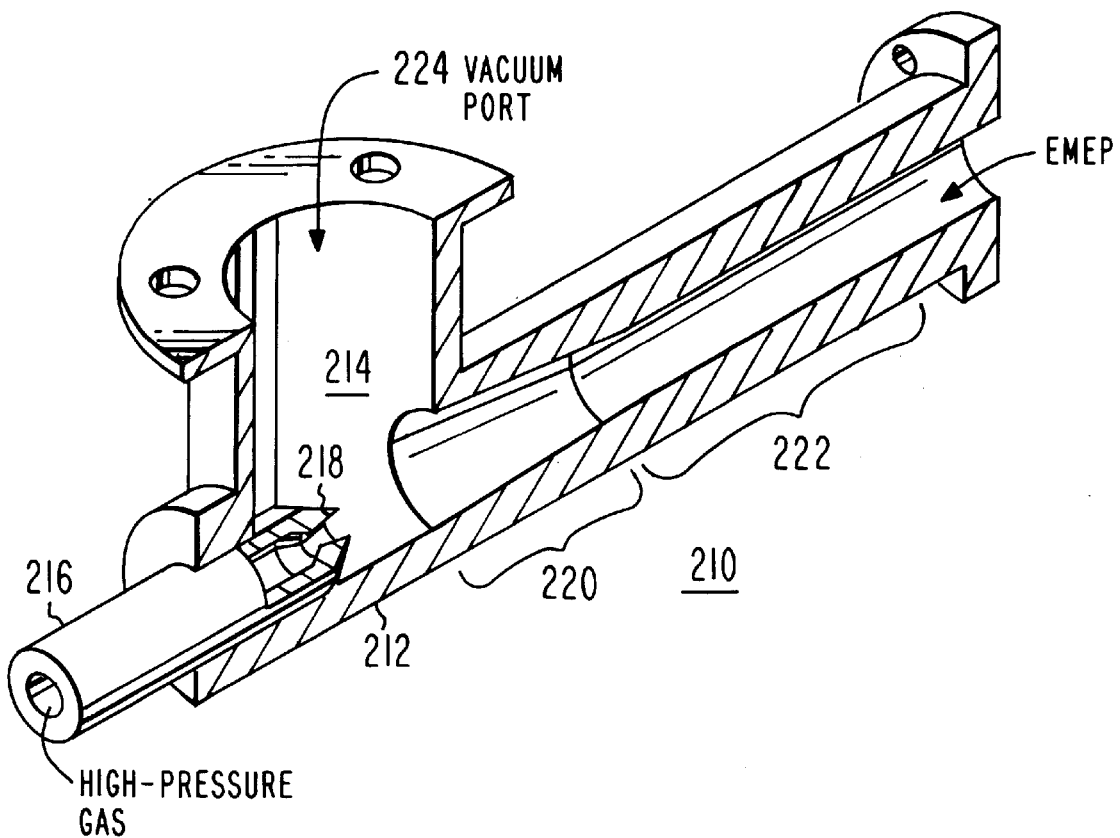
FIG. 2 is a perspective or isometric view, partially cut away, illustrating the operation of a commercial gas ejector vacuum pump.

In FIG. 2, a commercial gas ejector is designated generally 210. Ejector 210 includes a body 212 which defines a chamber 214. A pressurized-gas input pipe 216 passes through body 212 and into chamber 214. At the end of pipe 216, a converging-diverging nozzle 218 allows the high-pressure gas to be injected into chamber 214, thereby tending to entrain ambient molecules, and to pull such entrained molecules into an exit region 220. The motive gas and the entrained molecules are slowed in a venturi diffuser region 222, and leave the vacuum pump at an entrained-matter exit port EMEP. In accordance with Bernoulli's principle, the total pressure, which is a constant, is the sum of the static and dynamic pressures. As the dynamic pressure rises due to increased velocity, the static pressure decreases. The result is that a partial vacuum is generated in the vicinity of nozzle 218. The body ducts the vacuum to a vacuum port 224. The magnitude of the partial vacuum is responsive to the pressure of the high-pressure motive fluid.

Figure 3:
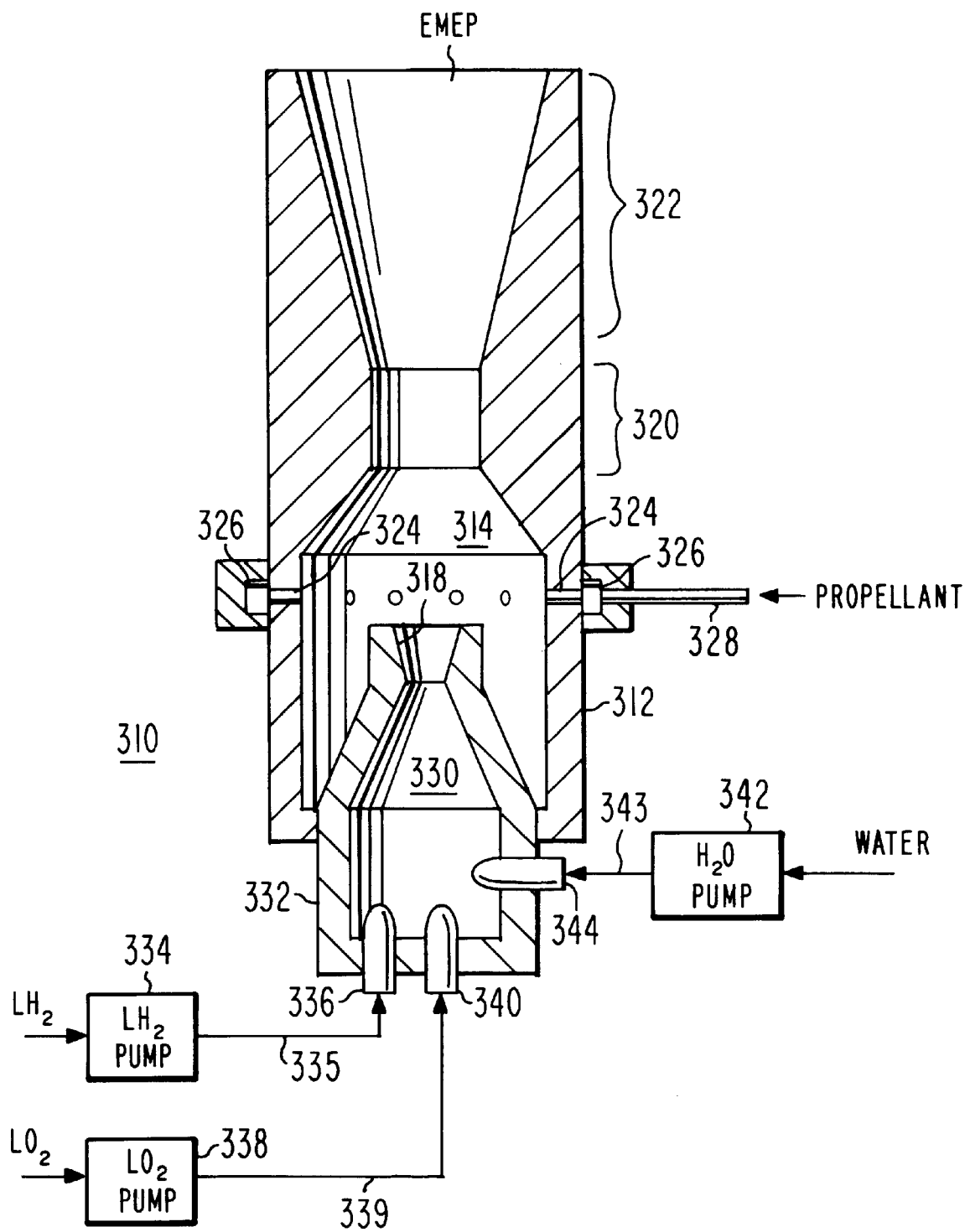
FIG. 3 is a simplified diagram of a vacuum pump according to an aspect of the invention.

FIG. 3 is a simplified diagram of a vacuum pump according to an aspect of the invention. In FIG. 2, an ejector designated generally as 310 has a body 312 which is made from the same general types of materials, generally metal, as the commercial ejector of FIG. 2 (as opposed to expensive, exotic high-temperature materials). A body 332 defines an inner chamber 330. Pressurized fluid within inner chamber 330 is ejected through a port or converging-diverging nozzle 318 into an outer chamber 314, corresponding to chamber 214 of FIG. 2, in a manner corresponding to that described in conjunction with FIG. 2, thereby tending to entrain ambient molecules, and to carry entrained molecules into an exit region 320. The motive fluid and entrained molecules are slowed in a venturi diffuser region 322 before exiting at an entrained-matter exit port EMEP. A plurality of apertures or ducts, some of which are designated 324, lead from chamber 314 to a circumferential channel 326, which is the vacuum plenum. The vacuum plenum or channel 324 connects with a vacuum pipe or channel 328. In the particular embodiment, pipe 328 communicates with a propellant tank, for lowering the vapor pressure for cooling and densification of the propellant.

In the arrangement of FIG. 3, a liquid hydrogen (LH2) pump 334 pumps liquid hydrogen from a source (not illustrated), by way of a path 335, to a hydrogen injection nozzle 336. A liquid oxygen (LO2) pump 338 similarly pumps liquid oxygen from a source (not illustrated), by way of a path 339, to an oxygen injection nozzle 340. When pumps 334 and 338 are operated, hydrogen and oxygen are injected into inner chamber 330 to form a combustible mixture. When the mixture is ignited (by means not illustrated), pressure is generated within inner chamber 330. As mentioned above, the generation of pressurized fluid in this manner results in temperatures in the vicinity of 6000° F., high enough to potentially damage the materials of the chamber 332 and the body 312.

During operation of the vacuum pump of FIG. 3, water pump 342 is operated to pump water from a source (not illustrated), by way of a path 343, to an injector nozzle 344, which injects water into the high-temperature fluid within chamber 330. The injected water absorbs energy from the combusting or combusted fluid as the water vaporizes, thereby cooling the fluid to a lower temperature. The cooled fluid within chamber 330 is injected into vacuum chamber 314 for entraining molecules as described above, and creates a vacuum. In addition to cooling the fluid, the vaporization of the water results in an increase in the mass flow of pressurized fluid within the inner chamber 330 over the mass flow which would exist in the absence of water injection. This enhanced mass flow, in turn, increases the capacity of the vacuum pump 310.

Figure 4:
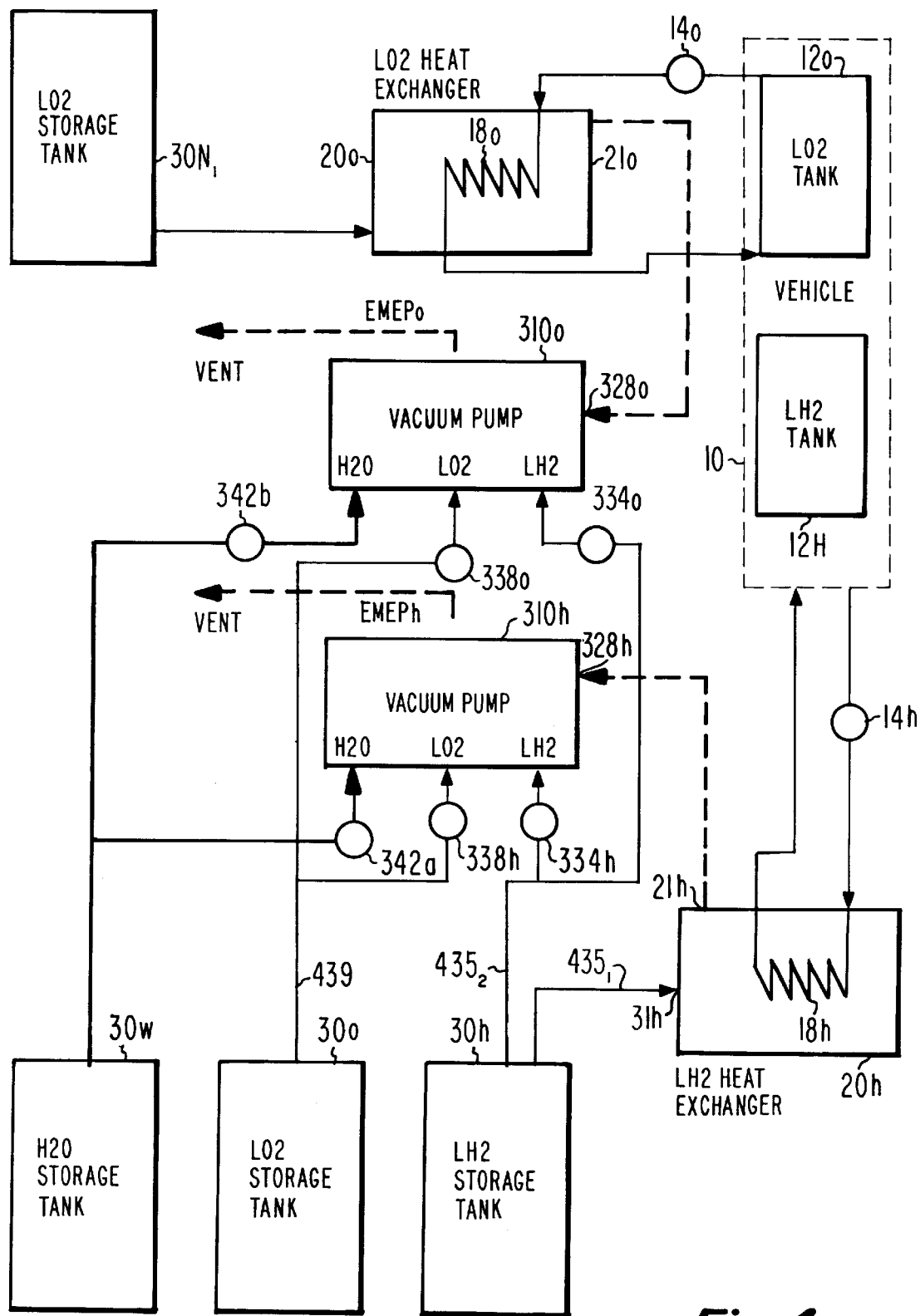
FIG. 4 is a simplified diagram illustrating operation of the pump of FIG. 3 for propellant densification.

FIG. 4 is a simplified diagram illustrating a propellant densification arrangement according to an aspect of the invention. In FIG. 4, vehicle or spacecraft 10 includes two propellant tanks, namely a liquid hydrogen tank 12$h$ and a liquid oxygen tank 12$o$. A circulating pump 14$h$ circulates liquid hydrogen from tank 12$h$ through the heat-exchange pipe 18$h$ in a coolant bath tank 20$h$. Similarly, a circulating pump 14$o$ circulates liquid oxygen from tank 120 through the heat-exchange pipe 18$o$ in a coolant bath tank 20$o$.

In the arrangement of FIG. 4, liquid hydrogen is supplied from a storage tank 30$h$ by way of a path $435_1$ to a replenishment input port 31$h$ of coolant bath 20$h$. Liquid hydrogen is also supplied by way of path $435_2$ to pumps 334$h$ and 334$o$, for providing the liquid-hydrogen portion of the fuel to the hydrogen and oxygen vacuum pumps 310$h$ and 310$o$, respectively. Liquid oxygen is supplied from tank 30$o$, by way of a path 439, to pumps 338$h$ and 338$o$, for providing the liquid-oxygen portion of the fuel to the hydrogen and oxygen vacuum pumps 310$h$ and 310$o$, respectively. Pump 334$h$ pumps liquid hydrogen to the injector (not illustrated in FIG. 4) associated with the LH2 input of hydrogen vacuum pump 310$h$. Pump 338$h$ pumps liquid oxygen to the injector (not illustrated in FIG. 4) associated with the LO2 input of hydrogen vacuum pump 310$h$. Similarly, pump 334$o$ pumps liquid hydrogen to the injector (not illustrated in FIG. 4) associated with the LH2 input of hydrogen vacuum pump 310$o$. Pump 338$o$ pumps liquid oxygen to the injector (not illustrated in FIG. 4) associated with the LO2 input of vacuum pump 310$o$. Operation of the pumps provides hydrogen and oxygen fuel to the vacuum pumps 310$h$ and 310$o$.

In the arrangement of FIG. 4, a water supply tank 30$w$ provides water to a pair of pumps 342$a$ and 342$b$, which supply pressurized water to the water ($H_2O$) inputs of vacuum pumps 310$h$ and 310$o$, respectively. During operation of the vacuum pumps 310$h$ and 310$o$, water is injected, to thereby cool the motive fluid, and to increase the mass flow, as described above. The vacuum port 328$h$ of vacuum pump 310h is coupled to the vent 21h of coolant bath tank 20h for lowering the vapor pressure of the liquid hydrogen coolant. Gaseous hydrogen from coolant tank 20h is entrained in the motive fluid of vacuum pump 310h during operation of the pump. The vacuum port 328o of vacuum pump 310o is coupled to the vent 21o of coolant bath tank 20o for lowering the vapor pressure of the coolant therein. A storage tank 30N outside the vehicle 10 stores liquid nitrogen (LN2) for use as a coolant, and supplies it to LO2 heat exchanger 20o. Nitrogen is used as a coolant for the liquid oxygen rather than hydrogen, because the temperature of LH2 is undesirably low enough to freeze the liquid oxygen propellant. Gaseous nitrogen from coolant tank 20o is entrained in the motive fluid of vacuum pump 310o during operation of the pump. Operation of the vacuum pumps 310h and 310o as described reduces the vapor pressure of the hydrogen and nitrogen coolants in tanks 20h and 20o, respectively, to thereby reduce the coolant temperature. The liquid hydrogen flowing from tank 12h, through circulating pump 14h, and through heat transfer pipe 18h back to vehicle tank 12h, is cooled below its atmospheric-pressure temperature, thereby reducing its volume. The liquid oxygen flowing from tank 12o, through circulating pump 14o, and through heat transfer pipe 18o back to vehicle tank 12o, is cooled below its atmospheric-pressure temperature, thereby reducing its volume. When the propellants aboard the vehicle 10 are sufficiently dense, its tanks are decoupled from the densifying equipment, and the vehicle may launch or otherwise proceed.

It should be noted that the ejected matter from the pumps of FIG. 4 with the described fuel is simply the product of the combustion of hydrogen with oxygen, which is water or steam, and is thus environmentally unobjectionable. The injection of additional water makes no environmental difference. The entrained gaseous oxygen or hydrogen in the ejecta of the pumps is no more objectionable than the equivalent nitrogen or hydrogen occasioned by simple venting or by venting with a conventional pump.

Other embodiments of the invention will be apparent to those skilled in the art. For example, while a single water injector has been illustrated, a plurality of water injectors may be used. While no ancillary cooling has been described, a circulating-water jacket or other cooling arrangement may be associated with the body of either (or both) chamber(s) to aid in maintaining the temperature. While only one vacuum pump has been shown attached to the cooling bath tank, multiple pumps may be required.

Thus, a vacuum pump (310; 310h, 310o) according to an aspect of the invention includes a first chamber (330) defining an exit nozzle (318), a hydrogen injector (336) for injecting hydrogen thereinto, and an oxygen injector (340) for injecting oxygen thereinto, for generating an LH2-LO2 combustible mixture which, during combustion, produces pressure within the chamber (330) and ejects combustion products from the exit nozzle (318). A second chamber (314) surrounds the exit nozzle (318). The second chamber (314) defines an exit region (320, 322) and a vacuum port (324, 328), such that when the LH2-LO2 combustion products are ejected from the exit nozzle (318) of the first chamber (330), a vacuum is generated at the vacuum port (324, 328). The second chamber (312, 314) is made from a material which is subject to degradation at the temperature of the combustion products. As mentioned, this material is expected to be a conventional, commercial-grade metal, as used in a commercial steam ejector. A water injector (344) is coupled to the first chamber (330) for injecting water thereinto, for cooling the combustion products. The water tends to be vaporized by the energy of the combustion, so as to increase the mass flow through the exit nozzle (318), for thereby increasing the capacity of the vacuum pump (310; 310h, 310o) and also tending to reduce the degradation. In a particular embodiment of the invention, the pump (310; 310h, 310o) further includes a venturi diffuser (320) associated with the second chamber (314), for slowing the mass flow as it approaches an entrained-matter exit port (EMEP).

A method according to an aspect of the invention, for creating a vacuum, includes the steps of combusting (in chamber 330) a flow of hydrogen and oxygen, to thereby generate high-temperature steam, and constraining the high-temperature steam to flow through a converging-diverging nozzle (318), for producing a mass flow and velocity in the vicinity of the nozzle which results in a tendency to generate a vacuum. The method further includes the step of ducting (326) the vacuum to a utilization port (328) with a structure, ordinarily commercial-grade metal, which is subject to degradation at the temperature of the combustion products. A flow of water is injected into the combusting hydrogen and oxygen, for thereby (a) increasing the mass flow of the steam, and (b) reducing the temperature of the steam. In a particular mode of the method, the mass flow of steam is slowed at a location downstream of the exit nozzle (318).

A method for densifying propellant according to another aspect of the invention includes the steps of combusting a flow of hydrogen and oxygen to generate high-temperature steam, and constraining the high-temperature steam to flow through a converging-diverging nozzle, for producing a mass flow and velocity in the vicinity of the nozzle which results in a tendency to generate a vacuum. The vacuum is ducted to a utilization port with a structure which is subject to degradation at the temperature of the combustion products. A flow of water is injected into the combusting hydrogen and oxygen, for thereby (a) increasing the mass flow of the steam, and (b) reducing the temperature of the steam. The vacuum is coupled from the utilization port to a tank of cryogenic liquid, for thereby reducing its ullage pressure and tending to increase vaporization of the propellant, which lowers its temperature. The cryogenic liquid may be the propellant itself, or a heat transfer medium.

What is claimed is:

1. A vacuum pump, comprising:

a first chamber defining an exit nozzle;

a hydrogen injector for injecting hydrogen into said first chamber;

an oxygen injector for injecting oxygen into said first chamber, for generating a combustible mixture which, during combustion, produces pressure within said chamber and ejects combustion products from said exit nozzle;

a second chamber surrounding said exit nozzle, said second chamber defining an exit region and a vacuum port, such that when said combustion products are ejected from said exit nozzle, a vacuum is generated at said vacuum port, said second chamber being made from a material which is subject to degradation at the temperature of said combustion products; and a water injector for injecting water into said first chamber, for cooling said combustion products, said water tending to be vaporized by the energy of said combustion so as to increase the mass flow through said exit nozzle, for thereby increasing the capacity of said vacuum pump and also tending to reduce said degradation.

2. A pump according to claim 1, further comprising a venturi diffuser associated with said second chamber, for slowing said mass flow.

3. A method for creating a vacuum, said method comprising the steps of:

combusting a flow of hydrogen and oxygen to generate high-temperature steam;

constraining said high-temperature steam to flow through a converging-diverging nozzle, for producing a mass flow and velocity in the vicinity of said nozzle which results in a tendency to generate a vacuum;

ducting said vacuum to a utilization port with a structure which is subject to degradation at the temperature of said combustion of hydrogen and oxygen; and injecting a flow of water into said combusting flow of hydrogen and oxygen, for thereby (a) increasing the mass flow of said steam, and (b) reducing the temperature of said steam.

4. A method according to claim 3, further comprising the step of slowing said mass flow of said steam at a location downstream from said nozzle.

5. A method for densifying a cryogenic liquid, said method comprising the steps of:

combusting a flow of hydrogen and oxygen to generate high-temperature steam;

constraining said high-temperature steam to flow through a converging-diverging nozzle, for producing a mass flow and velocity in the vicinity of said nozzle which results in a tendency to generate a vacuum;

ducting said vacuum to a utilization port with a structure which is subject to degradation at the temperature of said combustion of hydrogen and oxygen;

injecting a flow of water into said combusting flow of hydrogen and oxygen, for thereby (a) increasing the mass flow of said steam, and (b) reducing the temperature of said steam;

coupling said vacuum from said utilization port to a tank of cryogenic liquid, for thereby reducing its ullage pressure and tending to increase vaporization of said cryogenic liquid, which lowers its temperature and densities said cryogenic liquid.

6. A method according to claim 5, wherein said cryogenic liquid is a propellant.

7. A method according to claim 5, wherein said cryogenic liquid is a coolant medium; and further comprising the step of:

thermally coupling propellant to said coolant medium for lowering the temperature of said propellant for thereby densifying said propellant.

\* \* \* \* \*